(12) United States Patent
Argue et al.

(10) Patent No.: US 9,135,652 B2
(45) Date of Patent: Sep. 15, 2015

(54) SCANNABLE RECIPE CARD TO ADD ITEMS TO SHOPPING LIST

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/688,103

(22) Filed: Nov. 28, 2012

(65) Prior Publication Data

US 2014/0144977 A1 May 29, 2014

(51) Int. Cl.
G06K 7/10 (2006.01)
G06Q 30/06 (2012.01)

(52) U.S. Cl.
CPC .................................. *G06Q 30/0633* (2013.01)

(58) Field of Classification Search
CPC .. G06Q 10/087; G06Q 30/0633; G06K 17/00
USPC .................... 235/385, 454, 462.01, 462.13
See application file for complete search history.

(56) References Cited

U.S. PATENT DOCUMENTS

| | | | |
|---|---|---|---|
| 4,071,740 A | 1/1978 | Gogulski | |
| 4,996,642 A | 2/1991 | Hey | |
| 5,424,524 A | 6/1995 | Ruppert | |
| 5,664,110 A * | 9/1997 | Green et al. | 705/27.2 |
| 5,884,281 A | 3/1999 | Smith | |
| 5,918,211 A | 6/1999 | Sloane | |
| 5,970,474 A | 10/1999 | LeRoy | |
| 6,199,753 B1 | 3/2001 | Tracy | |
| 6,577,861 B2 | 6/2003 | Ogasawara | |
| 6,587,835 B1 | 7/2003 | Treyz | |
| 6,640,214 B1 * | 10/2003 | Nambudiri et al. | 705/21 |
| 6,975,910 B1 | 12/2005 | Brown | |
| 7,063,263 B2 * | 6/2006 | Swartz et al. | 235/472.02 |
| 7,069,091 B2 * | 6/2006 | Williamson | 700/90 |
| 7,195,157 B2 * | 3/2007 | Swartz et al. | 235/383 |
| 7,213,743 B2 | 5/2007 | Carlson | |
| 7,797,204 B2 * | 9/2010 | Balent | 705/28 |
| 8,429,026 B1 | 4/2013 | Kolawa | |
| 8,430,302 B2 * | 4/2013 | Minnick et al. | 235/375 |
| 2001/0054008 A1 * | 12/2001 | Miller et al. | 705/26 |
| 2001/0054009 A1 * | 12/2001 | Miller et al. | 705/26 |
| 2001/0054067 A1 * | 12/2001 | Miller et al. | 709/203 |
| 2002/0002496 A1 * | 1/2002 | Miller et al. | 705/26 |
| 2002/0003166 A1 * | 1/2002 | Miller et al. | 235/462.13 |
| 2002/0023959 A1 * | 2/2002 | Miller et al. | 235/462.13 |
| 2002/0143860 A1 * | 10/2002 | Catan | 709/203 |

(Continued)

*Primary Examiner* — Paultep Savusdiphol
(74) *Attorney, Agent, or Firm* — Howard & Howard Attorneys PLLC

(57) ABSTRACT

A system and method for automatically importing retail grocery products into an electronic shopping list by importing the ingredients listed on a recipe card, page in a recipe book, or the like. The recipe card may contain an identifier code that is uniquely associated with that recipe. The identifier code may be presented on the recipe card as a bar code. The system includes a database of recipes that returns a list of products when queried with a recipe identifier code. A user may scan or otherwise import the recipe identifier code through a mobile computing device, which then presents the ingredients as products in an electronic shopping list. The electronic shopping list may be implemented in a smartphone app.

25 Claims, 3 Drawing Sheets

(56) References Cited

U.S. PATENT DOCUMENTS

| | | |
|---|---|---|
| 2002/0194075 A1 | 12/2002 | O'Hagan |
| 2003/0061113 A1* | 3/2003 | Petrovich et al. ............... 705/26 |
| 2003/0158796 A1* | 8/2003 | Balent ............................ 705/28 |
| 2004/0225578 A1 | 11/2004 | Hager |
| 2004/0267583 A1* | 12/2004 | Hornbacher et al. ............. 705/7 |
| 2005/0040230 A1* | 2/2005 | Swartz et al. ................. 235/383 |
| 2006/0178947 A1* | 8/2006 | Zsigmond et al. ............. 705/26 |
| 2006/0200480 A1* | 9/2006 | Harris et al. .................. 707/101 |
| 2006/0219780 A1* | 10/2006 | Swartz et al. ................. 235/383 |
| 2007/0290038 A1* | 12/2007 | Woodcock et al. ........... 235/383 |
| 2009/0172728 A1* | 7/2009 | Shkedi et al. .................... 725/34 |
| 2009/0177736 A1* | 7/2009 | Christensen et al. ......... 709/203 |
| 2009/0240518 A1* | 9/2009 | Borom et al. .................... 705/1 |
| 2011/0082824 A1* | 4/2011 | Allison et al. ................. 706/20 |
| 2012/0303480 A1 | 11/2012 | Stone |
| 2013/0041752 A1* | 2/2013 | Crum ........................ 705/14.57 |
| 2014/0158753 A1* | 6/2014 | Sisselman ..................... 235/375 |

* cited by examiner

SCANNABLE RECIPE CARD TO ADD ITEMS TO SHOPPING LIST

BACKGROUND

1. Field of the Disclosure

The present disclosure relates generally to systems and methods for importing items into an electronic shopping list. More particularly, the disclosure relates to systems and methods for importing products into an electronic shopping list, which products correspond to ingredients in a selected recipe.

2. Background

Currently, shopping in a grocery store is a product-centric activity, wherein the customer may refer to a list of items to purchase that is compiled prior to entering the store. Creating a grocery shopping list from one or more recipes can be a cumbersome task and prone to mistakes, for example inadvertently leaving critical ingredients off the shopping list, thereby necessitating a repeat shopping trip to purchase the forgotten items.

With the advent and proliferation of miniaturized handheld computing devices, commonly known as "smart phones," a shopping trip can be made significantly more convenient to consumers by using an electronic shopping list software application (commonly known as an "app") installed on a smart phone. However, shopping list apps currently available generally do not include an automated and meal-centric way to input a shopping list into the smart phone. What is needed, therefore, is a method and system for automatically inputting groups of products into a shopping list, wherein the products correspond to ingredients in a selected recipe.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
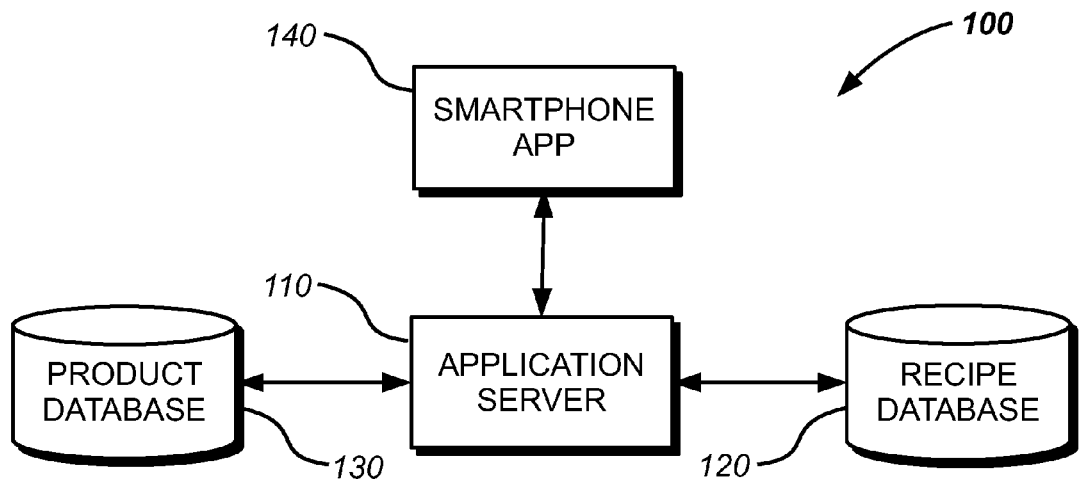
FIG. 1 is a block diagram depicting an embodiment of the recipe card system of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Systems and methods of the present disclosure may increase the convenience for retail customers using electronic shopping lists installed as smartphone applications ("apps") provided by a grocery retailer, thereby increasing the likelihood that the customers will shop at the retailer. Embodiments of the present disclosure include systems and methods that automatically import a shopping list into a smartphone shopping list app by allowing a retail grocery customer to select one or more meals or dishes. Selection of a meal by the customer leads to importation of listed ingredients for that meal into the shopping list app. In embodiments of the present disclosure, meals or dishes may be presented as recipe cards, flyers, pages in a book, or other printed publications that are distributed to customers or potential customers through mailers, print or electronic advertising campaigns, or available in-store. The cards or flyers may have a unique code that is input to the app to add the corresponding food items, cooking equipment, cutlery, or the like into the electronic shopping list.

With reference to FIG. 1, embodiments of the present disclosure include recipe card system 100, which comprises remote servers, databases, and/or computers that fulfill the functions disclosed and described herein. In the embodiment depicted, recipe card system 100 comprises application server 110, recipe database 120, product database 130, and smartphone app 140. In other embodiments, recipe database 120 and product database 130 are combined as a single database. Application server 110 comprises one or more computer systems adapted to transmit and receive data regarding selected products for sale at retail stores. Application server 110 is adapted to query recipe database 120 with a unique recipe identification code and receive a list of products in response. Application server 110 is also adapted to query product database 130 with unique product identification codes and receive product data in response. Application server 110 may transmit product data that it receives from product database 130 to a customer's smartphone app 140, which is adapted to present the product information in the form of a shopping list. The shopping list may be customized with data of particular relevance to the customer and the retail store at which the customer is mostly likely to shop. For example, the shopping list may be presented with price information for retail prices at a specific store. Additionally, the shopping list may include information related to the physical location of the products within the store. Other examples of information that may be presented include serving size information, nutritional information, complementary products, and substitute products.

As one of ordinary skill in the art having the benefit of this disclosure would understand, application server 110, recipe database 120, and product database 130 may all be implemented in one or more servers. Further, each of application server 110, recipe database 120, and product database 130 may comprise multiple servers to increase system efficiency by dividing tasks. The multiple servers may have mirrored data to prevent data loss in case of a disk failure and/or to decrease access and response times for database queries. In alternative embodiments of the present disclosure, application server 110, recipe database 120, and product database 130 may be carried out by computer-readable instructions and data stored on the customer's mobile computing device.

Figure 2:
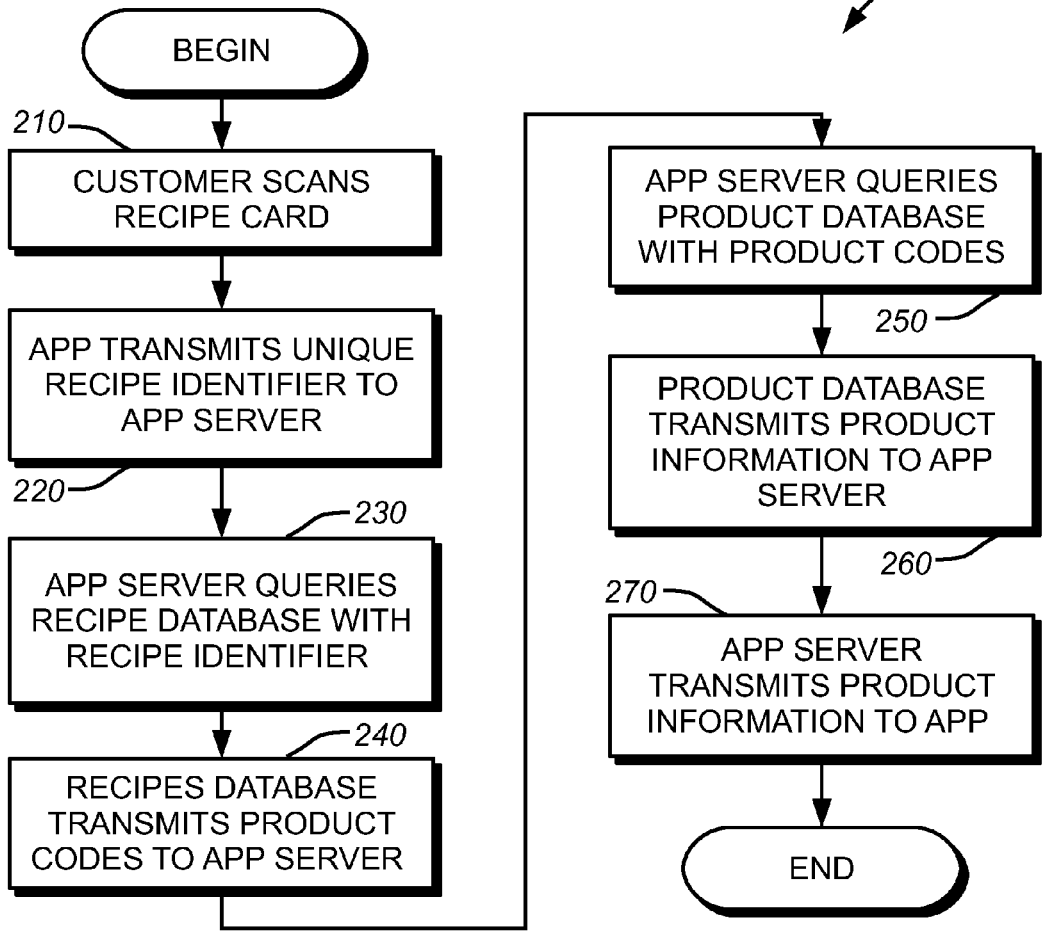
FIG. 2 is a process flow chart depicting a method of importing a shopping list according to the present disclosure.

Referring now to FIG. 2, an exemplary method 200 is presented by which systems of the present disclosure may create an itemized shopping list for a customer that inputs a recipe card. In operation 210, a customer scans a recipe card. In certain embodiments, the recipe card includes a one- or two-dimensional barcode (e.g., UPC barcode or matrix barcode) or the like. The barcode or the like corresponds to a unique recipe identifier code that is assigned to the specific recipe presented on the card. The customer may use her smartphone to input the barcode. In embodiments, the customer has grocery retailer's smartphone app 140 installed on her smartphone, and scans (or otherwise inputs) the recipe barcode from within the retailer's app. In operation 220, the recipe identifier code is transmitted from the smartphone to the application server 110. Transmission of the recipe identifier code, and other data transmissions described herein, may be effected through known communication methods, including wireless local networks, wide area networks, and the Internet.

In operation 230, the application server 110 transmits the recipe identifier to recipe database 120 and queries recipe database 120 for products called for in the recipe. In response, in operation 240, recipe database 120 transmits to the application server 110 product codes for products listed in the recipe. In embodiments of the present disclosure, product codes are linked to brand information and correspond to a sponsor or advertiser for that recipe card. For example, a manufacturer or distributor of cooking spices may sponsor recipe cards that feature the manufacturer or distributor's cooking spices products as ingredients. When such a recipe card is scanned and the recipe database 120 is subsequently queried, the recipe database 120 returns identification codes for those cooking spice products sold by that manufacturer or distributor. In operation 250, the application server 110 transmits the product codes to a product database 130 as a query for additional information related to the specific products. In operation 260, product database 130 responds to the query made by the application server 110 by transmitting data related to the products listed in the recipe. Such data may include price, images, in-store location, branding, marketing materials, or any other information relevant to the products or the recipe. In operation 270, the application server 110 compiles the product data and transmits it to the customer's smartphone app 140, which may then display the data in the form of a shopping list.

Figure 3:
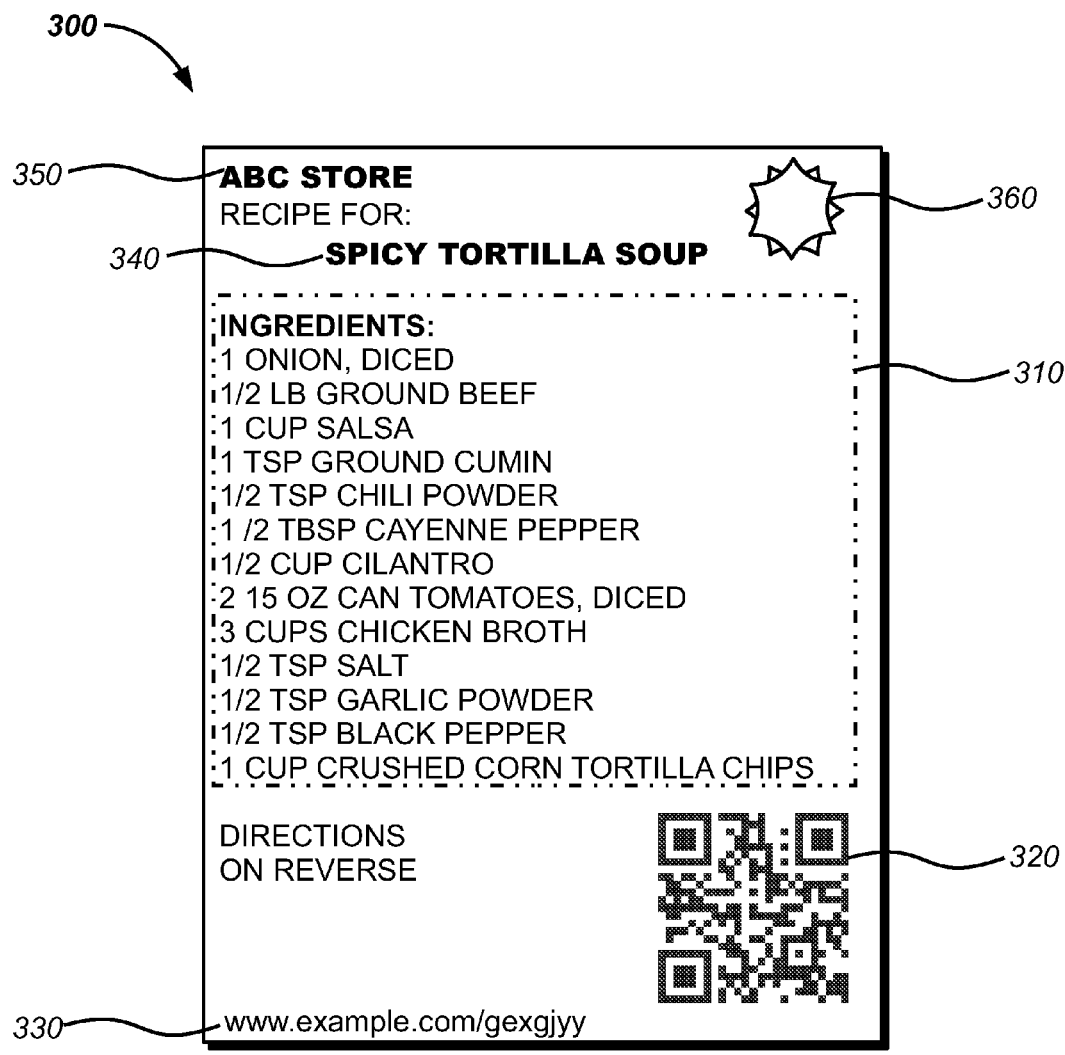
FIG. 3 is a depiction of a recipe card embodiment of the present disclosure.

Referring to FIG. 3, a recipe card 300 according to embodiments of the present disclosure is depicted. In embodiments, recipe card 300 comprises card stock or other durable paper stock or like material. In alternative embodiments, recipe card 300 is printed on other media. In embodiments, recipe card 300 is printed on product packaging and may be cut-out by the customer and/or scanned directly from the packaging. Alternatively, recipe card 300 is distributed in electronic form. As used herein, the term "card" means a flyer, card, mailer, pamphlet, circular, leaflet, page in a book, other printed paper or like material, or an electronic version of the foregoing. Recipe card 300 includes ingredients list 310. Ingredients list 310 comprises a list of ingredients needed to create the meal specified on the card 300. In embodiments, the ingredients in list 310 include brand information for each product. In alternative embodiments, recipe card 300 includes a list of cooking equipment, cutlery, or the like that may be useful for following the recipe.

Recipe card 300 further comprises barcode 320, which represents an encoded unique recipe identifier code associated with the recipe on card 300. In embodiments, barcode 320 represents a uniform resource locator ("URL") 330 that links users to a webpage presented by grocery retailer, product manufacturer, distributor, or other sponsor of card 300. Alternatively, the URL 330 links users to a webpage that has a download link for the retailer's shopping cart smartphone app. In embodiments, a customer scans barcode 320 from within the retailer's smartphone app 140 and the app 140 then responds by adding ingredients 310, cooking equipment, cutlery, or the like to the customer's current electronic shopping list. As depicted in FIG. 3, URL 330 is printed on recipe card 300. In alternative embodiments, no URL is printed on the card. In alternative embodiments, a customer scans card 300 or barcode 320 by directing an augmented reality head-mounted display camera at the recipe card 300 or the barcode 320. Image processing and recognition modules in a smartphone, an augmented reality head-mounted device, or the like may identify the card 300 and transmit the recipe identifier associated thereto to the recipe database 120.

In embodiments, multiple unique recipe identifier codes are associated with each recipe to allow tracking of click-through rates of certain recipe cards 300 distributed through various distribution methods. For example, recipe cards 300 may be distributed by the retailer through mailers, in-store displays, through magazine or other print ads, as coupons, through web pages, electronic mail, texts, or other known means. A distinct recipe identifier code may be used on the different recipe cards 300 for each distribution method, such that the retailer can monitor the success of each method. Further granularity in click-through tracking may be observed by using additional unique identifier codes within each distribution method. For example, a retailer may distribute recipe cards 300 at multiple displays within multiple retail stores. Each display within each store may carry recipe cards 300 having a recipe identifier code unique to the display, such that when a barcode 320 is scanned, the retailer can track that the card 300 was picked up from a specific store and a specific display within that store. As another example, a retailer may distribute recipe cards 300 throughout multiple geographic regions. A recipe card 300 printed for each geographic region may selectively be assigned a unique recipe identifier code so the click-through rates within each region may be tracked.

Recipe card 300 may selectively comprise recipe title 340 and store name 350 and logo 360. In embodiments, recipe directions are printed on the front or back of card 300. Alternatively, customers may view recipe directions by scanning barcode 320 or otherwise following a link to said directions. As would be understood by one of ordinary skill in the art having the benefit of this disclosure, additional marketing material or other literature may be printed on each card 300.

In embodiments, recipe card 300 is printed on a page in a book, for example as part of a recipe book. Such a recipe book may contain a compilation of many recipes, each with a corresponding barcode 320. As would be understood by one of ordinary skill in the art having the benefit of this disclosure, the recipe book may be sponsored, produced, and/or distributed by certain manufactures of retail grocery products. Such recipes may be associated with products manufactured by the sponsor as a method of increasing sales. Respective manufacturers of complementary products may choose to cooperate on recipes to jointly produce recipe books to co-promote their respective products.

Figure 4:
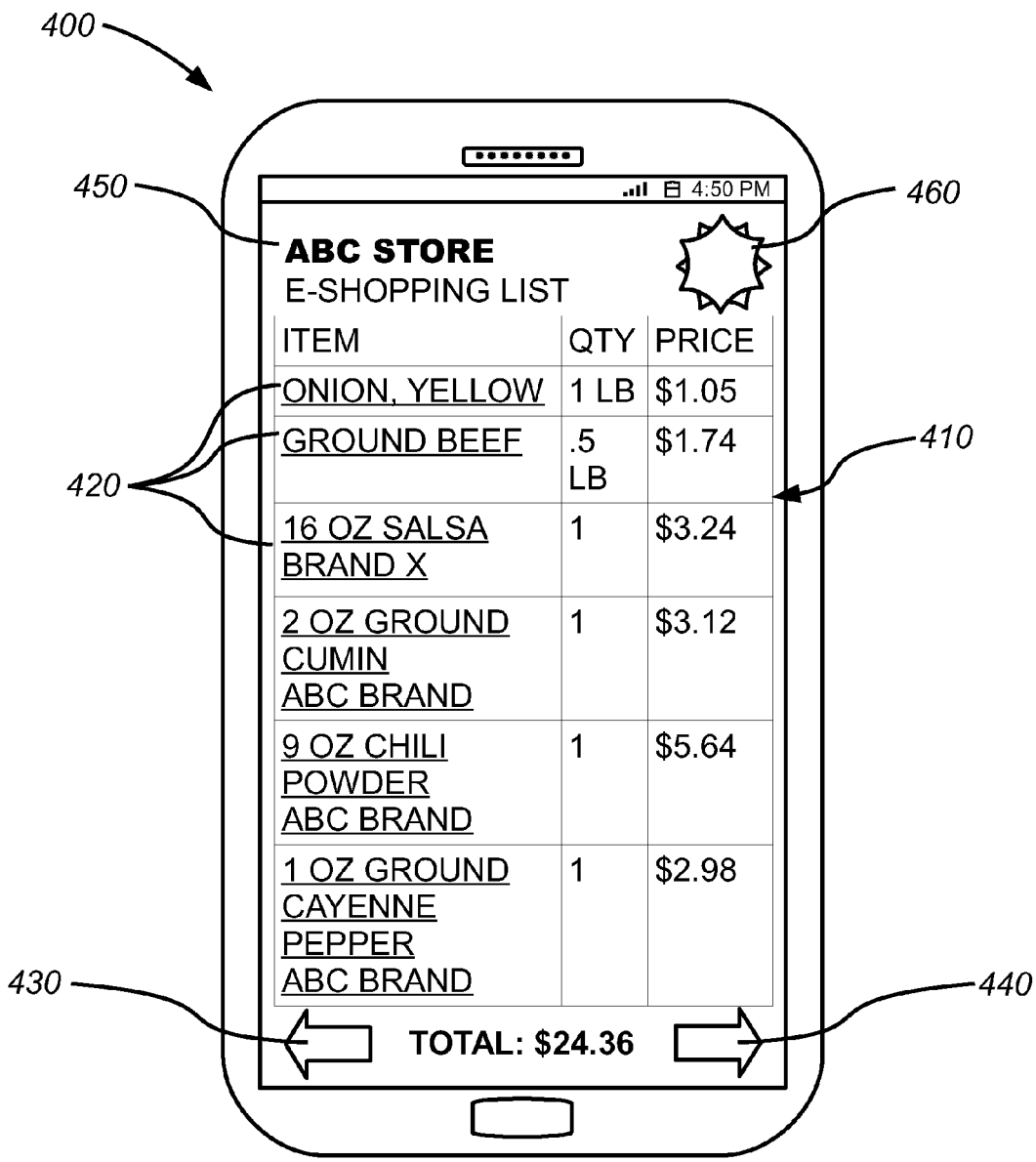
FIG. 4 is an illustration of a smartphone showing an electronic shopping list displayed thereby according to an embodiment of the present disclosure.

Referring to FIG. 4, an embodiment of a smartphone shopping list app 140 displayed on smartphone 400 is depicted. The shopping list 410 comprises products 420 that a customer input into the app, either manually, by scanning a recipe card 300, or by other means. After adding products by scanning barcode 320, customer may selectively remove items 420 that are not needed from the list (e.g., because the customer already has that ingredient in his pantry at home). Left arrow 430 and right arrow 440 may be provided to allow customer to navigate between screens if the shopping list 410 has too many items 420 to be displayed at once.

List 410 comprises clickable links for each product 420 that the customer may follow for more information, to substitute or remove an item, or to receive in-store item location. As depicted in FIG. 4, shopping list 410 includes price and quantity information for each item. The display may further include store name 450 and logo 460. Other user interfaces for the shopping list 410 may be used that still fall under the scope of this disclosure.

In embodiments of the present disclosure, the recipe card system 100 selectively customizes and presents information pertinent to the particular customer. For example, a specific retail store or branch may be associated with a customer because that store or branch is close to the customer's location, workplace, and/or residence, because the customer has selected that she typically shops at that store, or because the customer has previously purchased items from that store. Information presented by the app 140 may be tailored to that store. Shopping list items may be automatically substituted with replacement items if the selected store does not carry the item imported from the selected recipe. The shopping list may present prices specific to the selected store.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of adding one or more products to a shopping list comprising:
associating, in a recipe database, a recipe identification code with a recipe, wherein the recipe identification code is one of multiple unique recipe identifiers associated with the recipe, each one of the multiple unique recipe identifiers being associated with a different distribution method;
receiving, at an application server, the recipe identification code from a mobile computing device; and
transmitting product information to the mobile computing device, wherein the product information pertains to one or more products called for in the recipe.

2. The method of claim 1, further comprising compiling a shopping list that includes the one or more products.

3. The method of claim 1, further comprising distributing a card having the recipe identification code and the recipe printed thereon.

4. The method of claim 3, wherein the card is a page in a recipe book.

5. The method of claim 1, further comprising associating the one or more products with the recipe in a database.

6. The method of claim 1, wherein the data comprise information related to a physical, in-store location of at least one retail product at a selected retail location.

7. The computer-implemented method of claim 1, further comprising the step of tracking the distribution method associated with the receipt identification code.

8. The method of claim 1, wherein the product information includes product availability at a selected retail location and price information associated with the one or more products at the selected retail location.

9. A system for adding a group of products to a shopping list comprising:
    a product database having product information linked to corresponding product codes;
    a recipe database having one or more product codes linked to a unique recipe identification code, wherein the unique recipe identification code is one of multiple unique recipe identifiers associated with a recipe, each one of the multiple unique recipe identifiers being associated with a different distribution method;
    an application server adapted to:
        receive the unique recipe identification code from a mobile computing device;
        transmit the unique recipe identification code to the recipe database;
        receive product information from the product database; and
    transmit the product information to the mobile computing device.

10. The system of claim 9, wherein the product information includes price information and in-store product location.

11. The system of claim 9, further comprising an application installed on the mobile computing device, wherein the application is adapted to display a shopping list comprising one or more products that are associated with the unique recipe identification code.

12. The system of claim 9, wherein the application server is further adapted to transmit the unique recipe identification code to the recipe database as part of a query seeking the one or more product codes linked to the unique recipe identification code.

13. The system of claim 12, wherein the application server is further adapted to transmit the one or more product codes to the product database as part of a query seeking the product information corresponding to the one or more product codes.

14. The system of claim 9, the application being configured to track the distribution method associated with the receipt identification code.

15. The system of claim 9, wherein the product information includes product availability at a selected retail location and price information associated with the one or more products at the selected retail location.

16. A method of inputting a shopping list into a mobile computing device, comprising:
    scanning, by a mobile computing device, a recipe card to obtain from the recipe card a recipe identification code, wherein the recipe identification code is one of multiple unique recipe identifiers associated with a recipe, each one of the multiple unique recipe identifiers being associated with a different distribution method;
    sending, by the mobile computing device, the recipe identification code to a remote computer;
    receiving, by the mobile computing device from the remote computer in response to the sending, information related to at least one ingredient listed on the recipe card;
    adding at least one retail product to a shopping list, wherein the at least one retail product corresponds to the at least one ingredient; and
    displaying the shopping list.

17. The method of claim 16, wherein scanning a recipe card comprises scanning a bar code on a recipe card.

18. The method of claim 16, wherein scanning a recipe card comprises directing a smartphone camera at the recipe card.

19. The method of claim 16, wherein scanning a recipe card comprises directing an augmented reality head-mounted display camera at the recipe card.

20. The method of claim 16, wherein the information is related to an in-store location of the least one retail product.

21. The method of claim 16, further comprising selectively removing at least one retail product from the shopping list.

22. The method of claim 16, wherein the recipe card comprises a page in a book.

23. The method of claim 16, wherein scanning a recipe card occurs in a retail store.

24. The method of claim 16, further comprising the step of tracking the distribution method associated with the receipt identification code.

25. The method of claim 16, wherein the information related to at least one ingredient includes availability of the at least one ingredient at a selected retail location and price information associated with the at least one ingredient at the selected retail location.

* * * * *